United States Patent [19]

Takahashi

[11] Patent Number: 5,438,564
[45] Date of Patent: * Aug. 1, 1995

[54] MAGNETO-OPTICAL DISK HUB IN WHICH THE INNER PERIPHERAL EDGE PORTION OF THE SPINDLE OPENING IS STRENGTHENED AND MADE ABRASION RESISTANT

[75] Inventor: Kenji Takahashi, Miyagi, Japan

[73] Assignee: Sony Corporation, Tokyo, Japan

[*] Notice: The portion of the term of this patent subsequent to Jul. 6, 2010 has been disclaimed.

[21] Appl. No.: 177,539

[22] Filed: Jan. 5, 1994

Related U.S. Application Data

[60] Continuation of Ser. No. 7,190, Jan. 21, 1993, Pat. No. 5,289,456, which is a division of Ser. No. 884,305, May 11, 1992, Pat. No. 5,226,033, which is a continuation of Ser. No. 672,834, Mar. 21, 1991, abandoned.

[30] Foreign Application Priority Data

Mar. 27, 1990 [JP] Japan .................. 2-077972
Mar. 30, 1990 [JP] Japan .................. 2-084308

[51] Int. Cl.$^6$ .................. G11B 23/00; G11B 17/02
[52] U.S. Cl. .................. 369/290; 369/271; 360/135
[58] Field of Search .......... 360/133, 135, 137; 369/271, 290, 291; 430/130

[56] References Cited

U.S. PATENT DOCUMENTS

| | | | |
|---|---|---|---|
| 4,660,119 | 4/1987 | Kato et al. | 360/133 |
| 4,743,994 | 5/1988 | Kato et al. | 360/133 |
| 4,827,470 | 5/1989 | Odawara et al. | 369/290 |
| 4,829,510 | 5/1989 | Takahashi | 369/290 |
| 4,866,697 | 9/1989 | Yamaguchi et al. | 369/290 |
| 4,982,399 | 1/1991 | Odawara et al. | 369/290 |
| 4,983,439 | 1/1991 | Saito | 369/290 |

FOREIGN PATENT DOCUMENTS

| | | | |
|---|---|---|---|
| 0026496 | 4/1981 | European Pat. Off. | 360/135 |
| 0195330 | 9/1986 | European Pat. Off. | 360/136 |
| 0278358 | 8/1988 | European Pat. Off. | |
| 59-139136 | 8/1984 | Japan | 360/135 |
| 60-131631 | 7/1985 | Japan | 360/135 |
| 60-209985 | 10/1985 | Japan | 360/135 |
| 62-88189 | 4/1987 | Japan | 360/135 |
| 6-179477 | 7/1988 | Japan . | |
| 63-292475 | 11/1988 | Japan . | |
| 64-7391 | 1/1989 | Japan | 369/290 |

Primary Examiner—Stuart S. Levy
Assistant Examiner—George J. Letscher
Attorney, Agent, or Firm—Charles P. Sammut; Limbach & Limbach

[57] ABSTRACT

An optical disc equipped with a hub having a centering hole into which a spindle shaft of a disc driving mechanism is inserted, wherein a centering hole portion of the hub is provided with a centering hole reinforcing means made of a material excellent in abrasion resistance and smoothness or a member having a central hole is formed of a resin excellent in abrasion resistance and smoothness.

3 Claims, 6 Drawing Sheets

MAGNETO-OPTICAL DISK HUB IN WHICH THE INNER PERIPHERAL EDGE PORTION OF THE SPINDLE OPENING IS STRENGTHENED AND MADE ABRASION RESISTANT

This is a continuation of application Ser. No. 08/007,190, filed Jan. 21, 1993, now U.S. Pat. No. 5,289,465 which is a divisional of application Ser. No. 07/884,305 filed on May 11, 1992, now U.S. Pat. No. 5,226,003, of KENJI TAKAHASHI which is a continuation of application Ser. No. 07/672,834, filed Mar. 21, 1991, now abandoned.

BACKGROUND OF THE INVENTION

1. Field of the Invention present invention generally relates to optical discs and, more particularly, is directed to an optical disc used as a record medium on which a variety of information signals can be recorded.

2. Description of the Prior Art

Conventionally, optical discs such as a magneto-optical disc and so on are known as recording media on which a variety of information signals can be recorded.

An optical disc using a rotating drive unit for rotating such an optical disc, one employing a magnetic clamp system for reducing a thickness of an information read and write apparatus is proposed. This disc rotating drive unit employing the magnetic clamp system is constructed such that a magnet is arranged on a disc table, and a magnetic metal plate, mounted on the optical disc, is magnetically attracted by this magnet to integrate the optical disc with the disc table for rotation.

Therefore, the optical disc to be mounted on the disc rotating drive unit employing the magnet clamp system comprises a hub made of synthetic resin deposited at a central portion of the disc body for holding the magnetic metal plate.

Conventionally, there is, as this kind of optical disc comprising a deposited hub, for example, "Japanese Utility Model Application No. 62-199240 (Japanese Utility Model Laid-open Gazette No. 1-107072), and so on.

A concept of this conventional optical disc is shown in FIGS. 1 to 3.

In the drawings, reference numeral 1 generally designates an optical disc, and this optical disc 1 is composed of a disc body 2 and a hub 5 having a metal plate 3 around the peripheral edge of which a resin ring 4 is integrally formed.

The disc body 2 is made by molding a synthetic resin, for example, polycarbonate resin, in a disc shape, wherein a single surface or both surfaces are used as recording surfaces on which recording tracks are formed in the circumferential direction, and further a circular central aperture 2a is bored at a central portion thereof.

On the other hand, the metal plate 3 comprised in the hub 5 is made of a magnetic material, for example, a steel plate or the like and formed in a disc shape, wherein a centering aperture 6, smaller than the central aperture 2a of the disc body 2 is bored at a central portion thereof. And, the resin ring 4 is formed integral with a peripheral edge portion of this metal plate 3 by an outsert molding method, to thereby complete the hub 5.

The surface of the resin ring 4 opposing the disc body 2 is provided with an annular rib 7 for welding the hub 5 on the disc body 2. Also, from an inner peripheral portion of the resin ring 4, a plurality of guiding ribs 8, which are slidably contacted with the inner peripheral surface of the central hole 2a of the disc body 2, are protrusively provided in a one-leg form.

Then, when this hub 5 is mounted on the disc body 2, the surface of the resin ring 4 on which the rib 7 for welding is formed is opposed to the surface of the disc body 2, the guiding rib 8 is inserted into the central hole 2a, and the hub 5 is positioned in a condition that the guiding ribs 8 are contacted with the inner peripheral surface of the central hole 2a. Then, an ultrasonic horn is pressed on the resin ring 4, wherein application of an ultrasonic vibration in a predetermined period of time causes the rib 7 to melt and weld to the hub 5 on the disc body 2.

Thus, the hub 5 is mounted on the disc body 2 in a condition where the centering hole 6 of the metal plate 3 is precisely coincident with the center of the track of the disc body 2, that is, a so-called aligning is achieved.

The optical disc thus constructed is generally accommodated in a disc cartridge for preservation. Upon loading, the metal plate 3 of the hub 5 is attracted by the magnet on the disc table dispose on the disc driving mechanism side, while the spindle shaft is inserted into the centering hole 6 for positioning, and the disc is driven to rotate in this clamped state.

The optical disc as mentioned above is generally left in a free condition in the disc cartridge, which many times results in the centering hole 6 of the hub 5 and the spindle shaft of the disc driving mechanism side not always being aligned on the same axial line upon loading. For this reason, the hub 5 is clamped by the magnet on the disc table in a manner that the centering hole 6 of the hub 5 is forcedly brought to the spindle shaft, which gives rise to a defect that the centering hole 6 and the spindle shaft are abraded.

OBJECTS AND SUMMARY OF THE INVENTION

Accordingly, it is an object of the present invention to provide an improved optical disc which can substantially eliminate the aforenoted shortcomings and disadvantages encountered with the prior art.

More specifically, it is an object of the present invention to provide an optical disc in which a centering aperture of a hub and a spindle shaft of a disc drive mechanism can be effectively prevented from being worn so that a reliable clamping state can be obtained and a stable revolution can be carried out constantly.

Another object of the present invention is to provide an optical disc in which the life of the optical disc and a disc drive mechanism can be prolonged.

As a first aspect of the present invention, there is provided an optical disc having a hub comprising a metal plate having a centering hole at a central portion of a disc substrate and a ring-shaped member for securing this metal plate on a central portion of the disc substrate which is secured so as to align the center of the centering hole with the center of recording track of the optical disc, wherein reinforcing means is provided on the metal plate for preventing the centering hole from being abraded.

In accordance with a second aspect of the present invention, there is provided a disc equipped with a hub for a magnet clamp disposed at a central portion of a disc body, where the hub is composed of a metal plate to which a magnet is attracted, an outer peripheral ring formed integrally with the outer peripheral side of this metal plate by means of a resin having a fixing portion for an ultrasonic welding with the disc body, and an inner peripheral ring formed integrally with the inner peripheral side of the metal plate by means of a resin having a high abrasion resistance and a high smoothness and having a centering hole for positioning.

In a clamping operation of the disc thus constructed of the present invention, the centering hole of the hub is smoothly guided by the spindle shaft with a reduced-friction force in a sliding manner, whereby neither the centering hole nor the spindle shaft suffer from abrasion.

The above, and other objects, features and advantages of the present invention will become apparent from the following detailed description of illustrative embodiments thereof to be taken in conjunction with the accompanying drawings, in which like reference numerals are used to identify the same or similar parts in the several views.

DETAILED DESCRIPTION OF THE PREFERRED EMBODIMENTS

Figure 1:
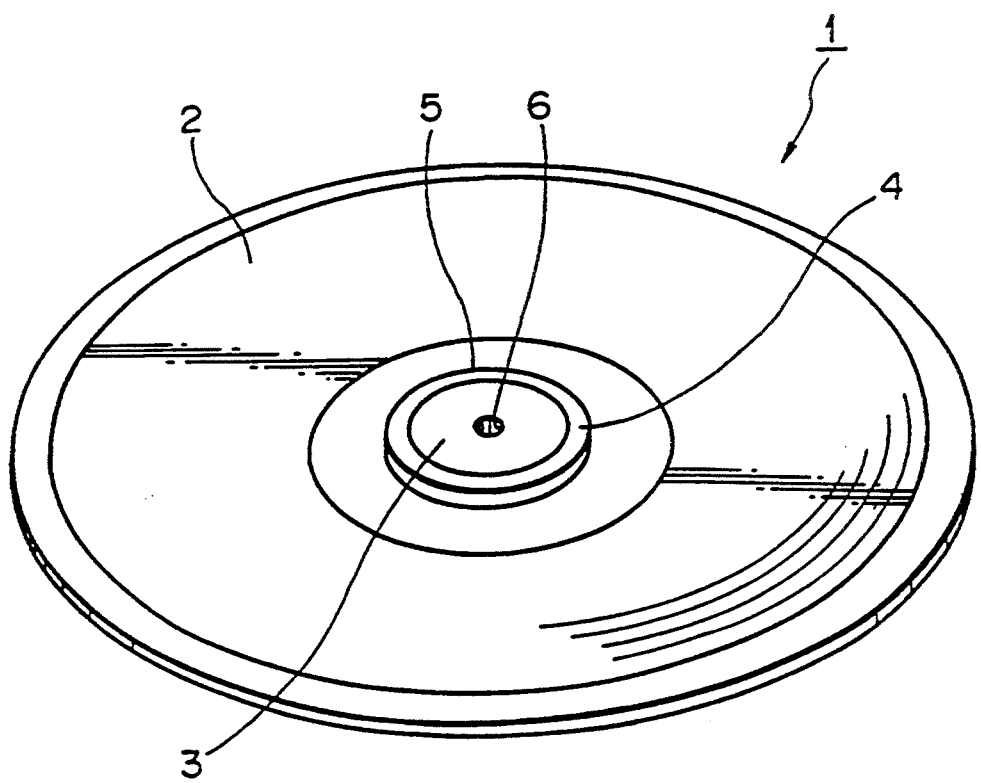
FIG. 1 is a perspective view of a disc according to the prior art.
Figure 2:
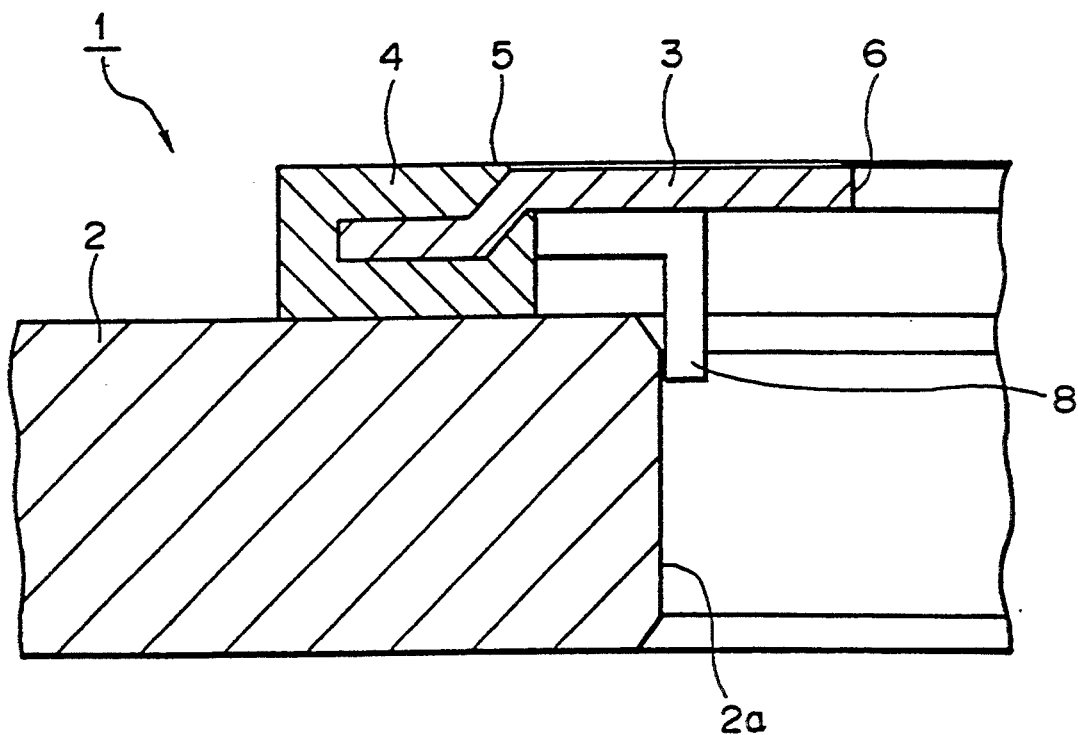
FIG. 2 is a vertical cross-sectional view of a main portion of the same.
Figure 3:
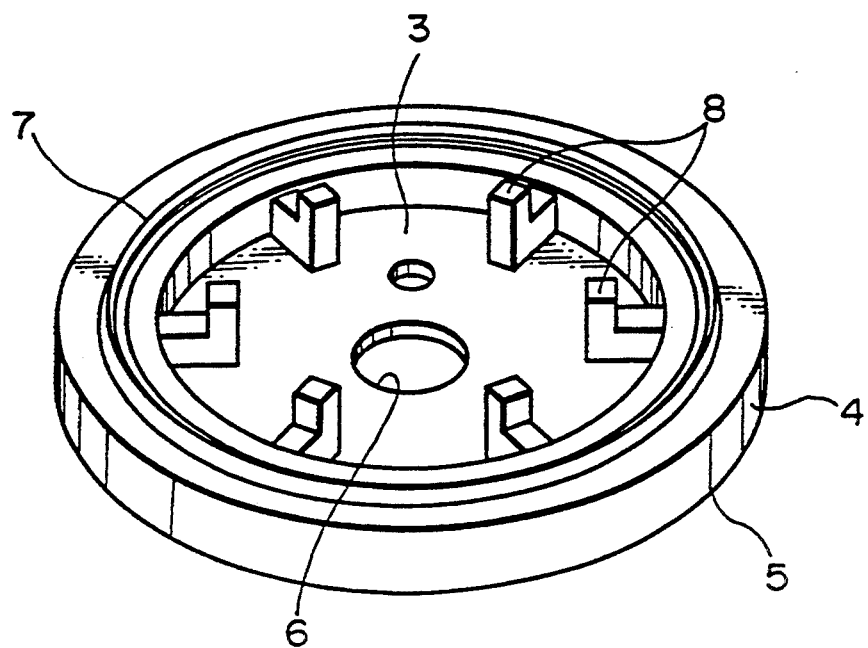
FIG. 3 is a perspective view of the rear side of its hub.
Figure 4:
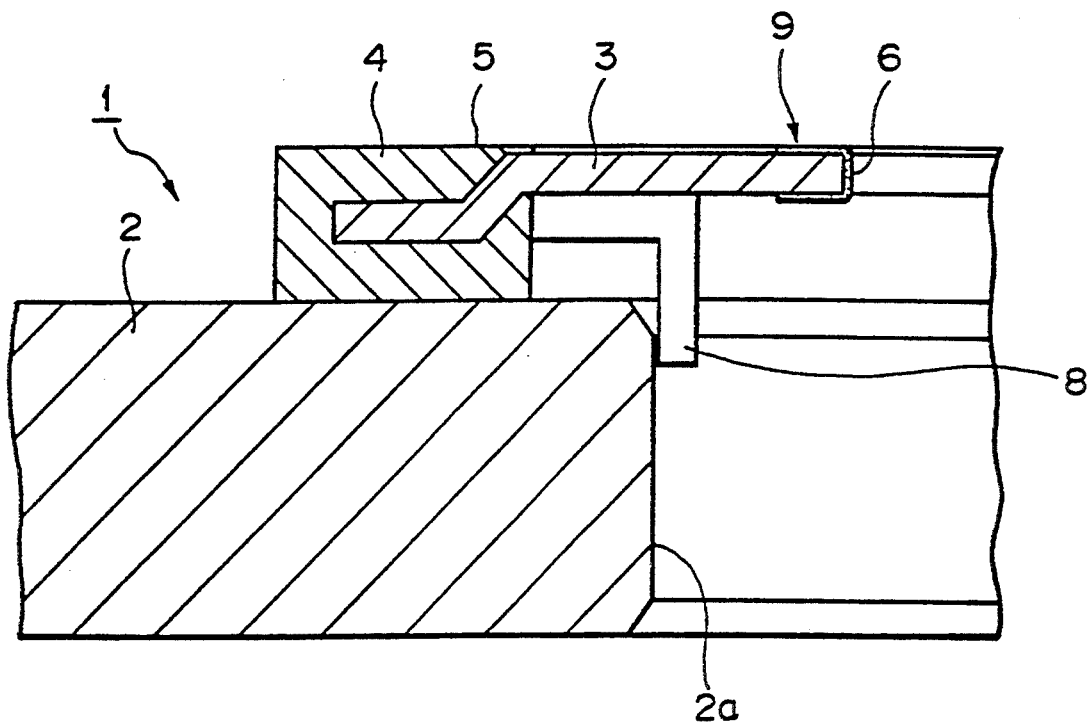
FIG. 4 is a vertical cross-sectional view of a main portion of a first embodiment according to the present invention.
Figure 5:
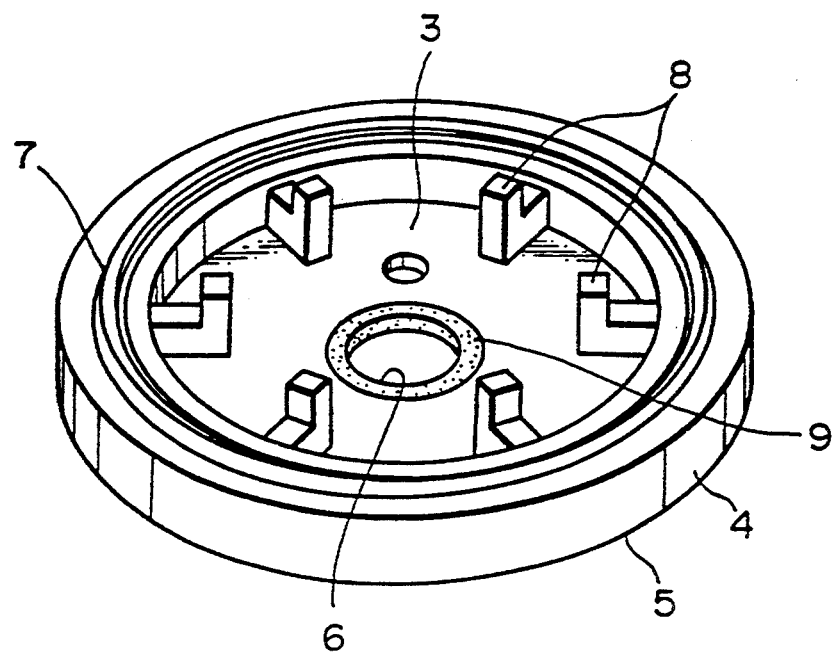
FIG. 5 is a perspective view of the rear side of its hub.
Figure 6:
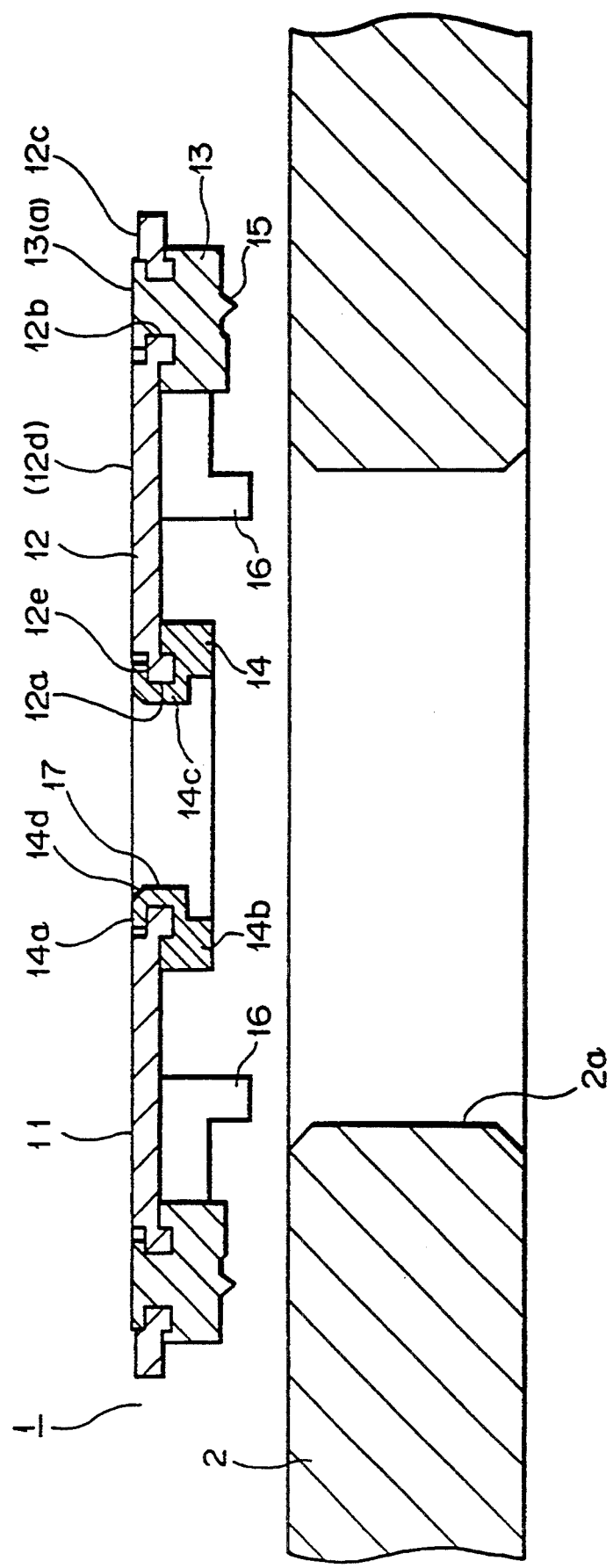
FIG. 6 is a vertical cross-sectional view (exploded view) of a main portion of a second embodiment according to the present invention.
Figure 7:
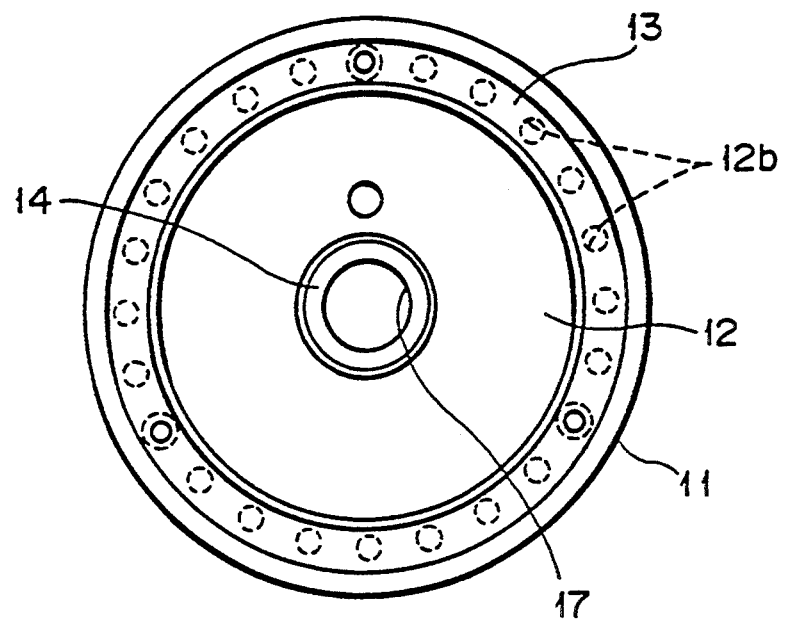
FIG. 7 is a plan view showing its hub.
Figure 8:
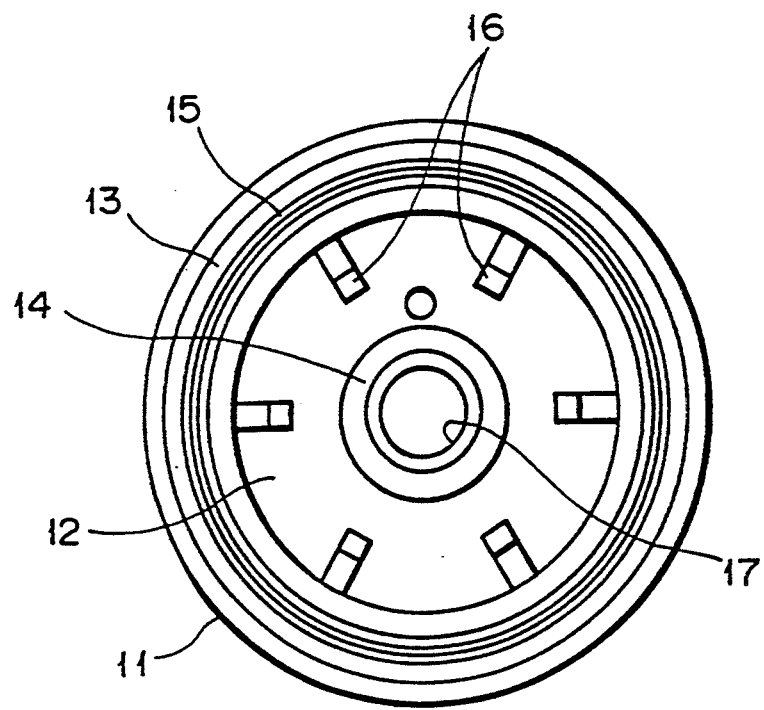
FIG. 8 is a plan view of the same taken from the rear side.
Figure 9:
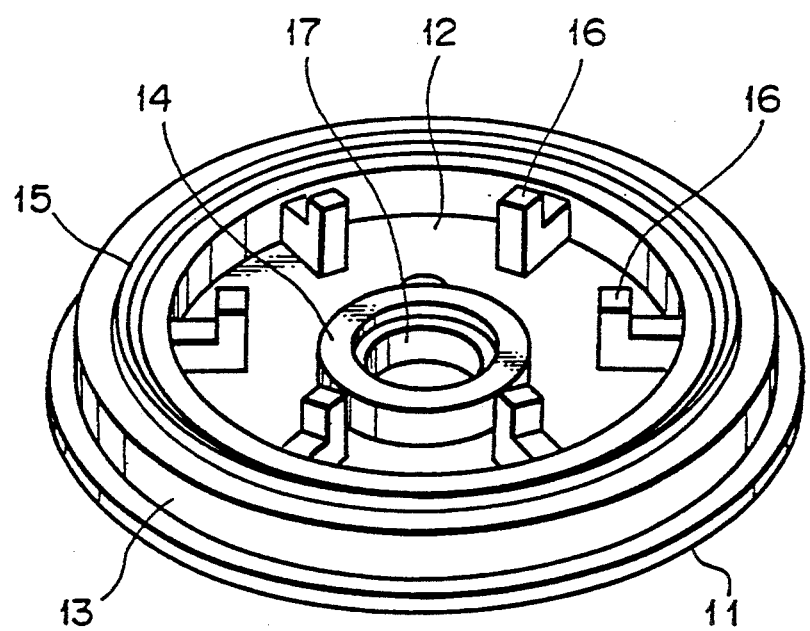
FIG. 9 is a perspective view of the same taken from the rear side.

Hereinafter, a first embodiment of the present invention will be explained with reference to FIGS. 4 and 5, where like parts corresponding to those in the prior art example shown in FIGS. 1 to 3 are designated the same reference numerals and explanation thereof will be omitted.

An optical disc 1 of this embodiment has a hub 5 disposed at a central portion thereof, wherein a portion from the inner peripheral surface of a centering hole 6 of a metal plate 3 to peripheral portions of this centering hole 6 is applied with a special surface treatment 9 which provides a required smoothness and abrasion resistance.

As specific means for this surface treatment, a method of forming a layer of nickel coating or chrome coating and impregnating a fluoric resin having a high smoothness into this layer is favorably employed. Alternatively, the highly smooth fluoric resin may be coated and sintered.

By applying the inner peripheral surface of the centering hole 6 of the metal plate 3 and the peripheral portions of the centering hole 6 with the surface treatment 9, the hardness of this portion is remarkably improved. Consequently, even if the centering hole 6 of the hub 5 and the spindle shaft of the disc driving mechanism are not precisely aligned upon loading, the centering hole 6 of the hub 5 is in a condition where the portion applied with the surface treatment 9 is favorably guided to the spindle shaft in a sliding manner, whereby a friction between the centering hole 6 and the spindle shaft is reduced, and accordingly neither the centering hole 6 nor the spindle shaft will be abraded, thereby constantly performing a secure clamping. Also, the portion applied with this surface treatment 9, because of the required abrasion resistance provided thereto, is not abraded easily.

Incidentally, the surface treatment 9 of the centering hole 6 of the hub 5, as mentioned above, is performed prior to the process of welding the hub 5 to the disc body 2. The hub 5 thus applied with the surface treatment 9 is mounted on the disc body 2 in a procedure similar to the foregoing prior art example. It is therefore possible to perform this surface treatment 9 easily in the manufacturing process of the hub 5 and consequently realize a long life optical disc at a low cost.

In the above embodiment, the surface treatment 9 is performed in a portion from the inner peripheral surface of the centering hole 6 of the metal plate 3 to peripheral portions of the centering hole 6, however, this surface treatment 9 may be performed only in a peripheral portion of the centering hole 6 or on the entire surface of the metal plate 3.

Also, the method of the surface treatment 9 is not limited to the method shown in the embodiment, and any method will do as long as excellent smoothness and abrasion resistance are provided thereby.

Next, a second embodiment of the present invention will be explained with reference to FIGS. 6 to 9.

The second embodiment provides a novel structure of a hub mounted on a disc body 2 different from the prior art.

More specifically, a hub 11 in an optical disc 1 of the present embodiment is composed of a metal plate 12, an outer peripheral resin ring (hereinafter simply called the outer peripheral ring) 13 integral with the outer peripheral side of this metal plate 12, and an inner peripheral resin ring (hereinafter simply called the inner peripheral ring) 14 integral with the inner peripheral side of the metal plate 12.

The metal plate 12 is formed in a disc shape, for example, of a steel plate, and a central portion thereof is formed with a central hole 12a. On the outer peripheral side of this metal plate 12, the outer peripheral ring 13 is integrally formed by an outsert molding method (this outer peripheral ring 13 is formed over both surfaces of the metal plate 12 through a plurality of through-holes 12b bored through a staged portion 12c on the outer peripheral side of the metal plate 12). On the surface of the outer peripheral ring 13 opposing the disc body 2, a rib 15 is formed for welding the hub to the disc body 2 in an annular shape. Also, a plurality of guiding ribs 16, to be brought into contact with the central hole 2a of the disc body 2, are protruded from the inner peripheral surface of the outer peripheral ring 13.

The surface of the outer peripheral ring 13 opposing a disc driving mechanism, that is, a surface 13a reverse to the surface on which the rib 15 for welding is provided, is formed so as to have a height substantially identical to a surface 12d of the metal plate 12. It is preferable that the surface 13a of the outer peripheral ring 13 is a bit protruded from the surface 12d of the metal plate 12 to prevent an ultrasonic horn from coming into contact with the surface 12d of the metal plate 12 upon ultrasonic welding.

As a material for this outer peripheral ring 13, a resin excellent in adhesivity (weldability) with the disc body 2 is employed. More specifically, since the disc body 2 is made of polycarbonate in this embodiment, the outer peripheral ring 13 is also molded of the same polycarbonate resin.

On the other hand, the inner peripheral ring 14 is molded integrally with the central hole 12a of the metal plate 12 by an outsert molding method, wherein the inner peripheral surface thereof is formed as a centering hole 17 into which a spindle shaft of the disc driving mechanism is inserted. Stated another way, the hub 11 of this embodiment has the centering hole 17 for positioning formed by the inner peripheral ring 14.

This inner peripheral ring 14 is composed of a portion 14a disposed on a staged portion 12e on the inner peripheral side of the metal plate 12, a portion 14b disposed on the disc opposing surface side of the metal plate 12, and a coupling portion 14c for coupling these portions 14a and 14b, with the centering hole 17 being bored through the coupling portion 14c. The surface of the portion 14a is formed to be substantially flush with the surface 12d of the metal plate 12. Also, on the coupling portion 14c side of the portion 14a, there is provided a tapered surface 14d for guiding the spindle shaft.

As a material for this inner peripheral ring 14, a resin having a high abrasion resistance and a high smoothness, for example, a polyacetal resin or a polycarbonate resin including fluorine is employed.

Incidentally, molding of the outer peripheral ring 13 and inner peripheral ring 14 is performed by a double outsert molding method which molds the outer peripheral ring 13 and the inner peripheral ring 14 onto the metal plate 12 in a sequence of molding processes by applying a dichromatic molding (double mold) method generally employed these days.

When the thus constructed hub 11 is mounted on the disc body 2, the surface of the outer peripheral ring 13, on which the rib 15 for welding is formed, is opposed to the disc body 2, the guiding ribs 16 are inserted into the central hole 2a and contacted with the inner peripheral surface thereof, and the hub 11 is positioned in this condition. Then, an ultrasonic horn is pressed on the outer peripheral ring 13 to apply ultrasonic vibrations for a predetermined time period, whereby the rib 15 for welding is melted, resulting in the hub 11 being welded on the disc body 2.

When the optical disc 1 with the hub 11 thus mounted thereon is loaded, the metal plate 12 of the hub 11 is attracted by a magnet on a disc table arranged in the disc driving mechanism, while the spindle shaft is inserted into the centering hole 17 to position the optical disc 1, wherein the disc 1 remains in a clamping state.

In this clamping operation, the highly smooth resin employed in the centering hole portion reduces friction between the central hole 17 and the spindle shaft, whereby the centering hole 17 is guided to the spindle shaft in a sliding manner, and accordingly neither the centering hole 17 nor the spindle shaft will be abraded. Also, since the inner peripheral ring 14 forming the central hole 17 has a required abrasion resistivity, it will not be abraded easily.

Thus, the optical disc 1 of the second embodiment, since the abrasion on the centering hole 17 of the hub 11 and the spindle shaft of the disc driving mechanism can be effectively prevented, provides a secure clamping condition and stable rotations.

Further, in the second embodiment the outer peripheral ring 13 of the hub 11 is molded by using polycarbonate of the same type as the disc body 2, so that the hub 11 and the disc body 2 exhibits a favorable weldability, which results in providing a high durability of the disc.

Incidentally, the material for the inner peripheral ring 14 of the hub 11 is not limited to the above-mentioned polyacetal, and any material may be employed as long as it is excellent in abrasion resistance and smoothness.

As is apparent from the above explanation, the disc of the present invention has a centering hole portion of a hub formed of a resin having a high smoothness and abrasion resistance, whereby neither the centering hole of the hub nor the spindle shaft will be abraded, therefore making it possible to largely contribute to the provision of a longer life of the disc and disc driving mechanism.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

I claim as my invention:

1. A magneto-optical disc for use with a disc recording/reproducing apparatus comprising:
   a circular recording disc substrate and
   a hub, said hub having a metal plate, an outer peripheral ring, and an inner peripheral ring,
   said metal plate having a top surface for opposing a magnetic clamping means of the disc recording/reproducing apparatus by a predetermined gap,
   said outer peripheral ring being attached to said metal plate on the outer peripheral side of said metal plate to a central portion of the circular disc substrate having recording tracks,
   said inner peripheral ring being made of a material having a high abrasion resistance and a high smoothness and arranged on the inner peripheral side of said metal plate and having a centering hole for centering the disc, and a top surface opposing said magnetic clamping means,
   said top surface of said metal plate and said top surface of inner peripheral ring forming a substantially flat surface,
   wherein said hub is secured to said disc substrate in a manner that the center of said inner peripheral ring is coincident with the center of said disc substrate, wherein said inner peripheral ring and said outer peripheral ring each have constant inner and outer annular diameters, and wherein said inner peripheral ring comprises a portion arranged on one surface side of said metal plate, a portion arranged on an other surface side of said metal plate, and a coupling portion arranged along the inner wall surface of a hole formed through a central portion of said metal plate for coupling said portion arranged on the one surface side of said metal plate with said portion arranged on the other surface side of said metal plate.

2. A magneto-optical disc according to claim 1, wherein said inner peripheral ring is made of a polycarbonate resin including fluorine.

3. A magneto-optical disc according to claim 1, wherein said inner peripheral ring is made of a polyacetal resin including fluorine.

* * * * *